May 22, 1945.   R. W. PEACOCK   2,376,805
MOLDING APPARATUS
Filed Aug. 3, 1943   2 Sheets-Sheet 1
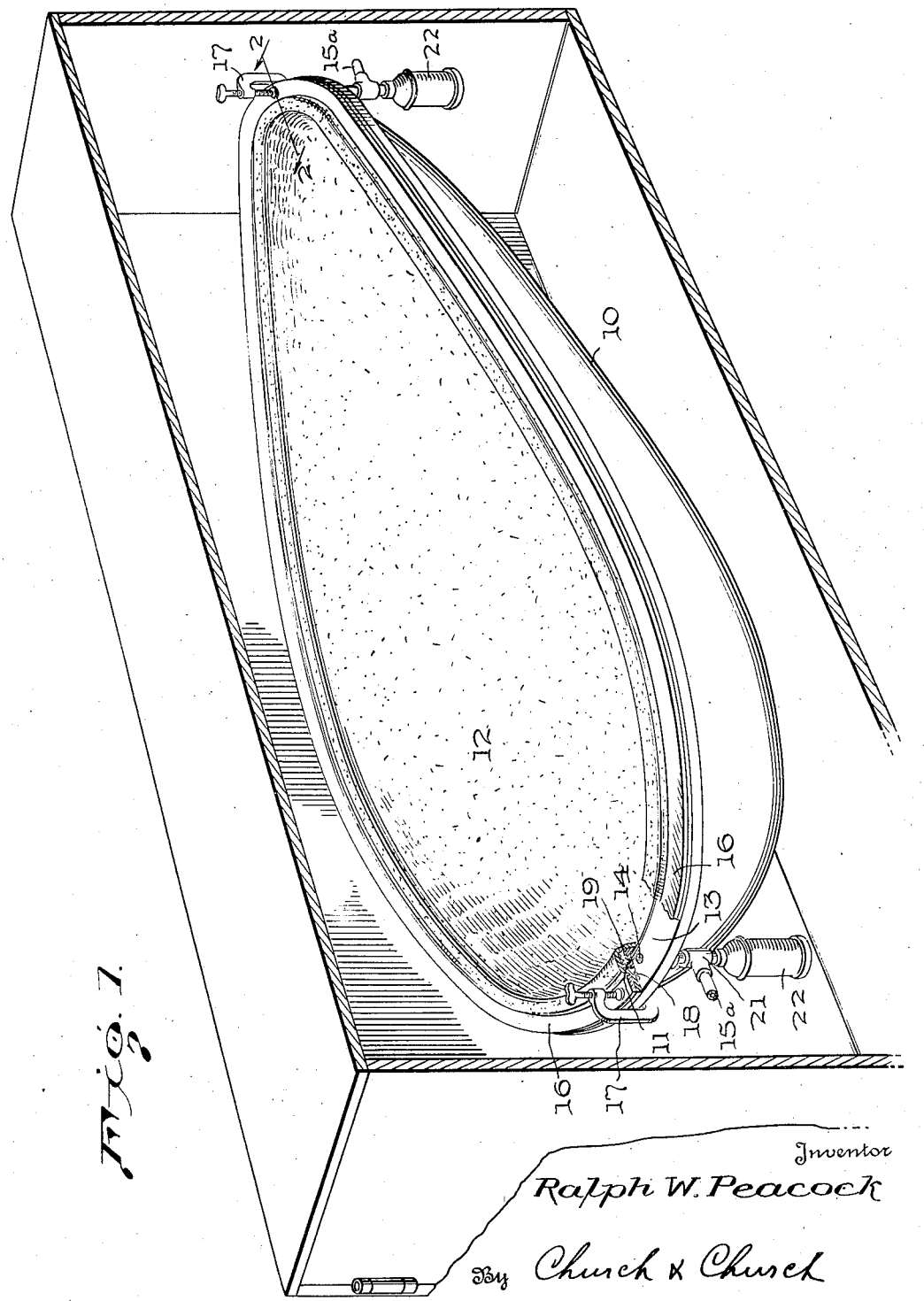

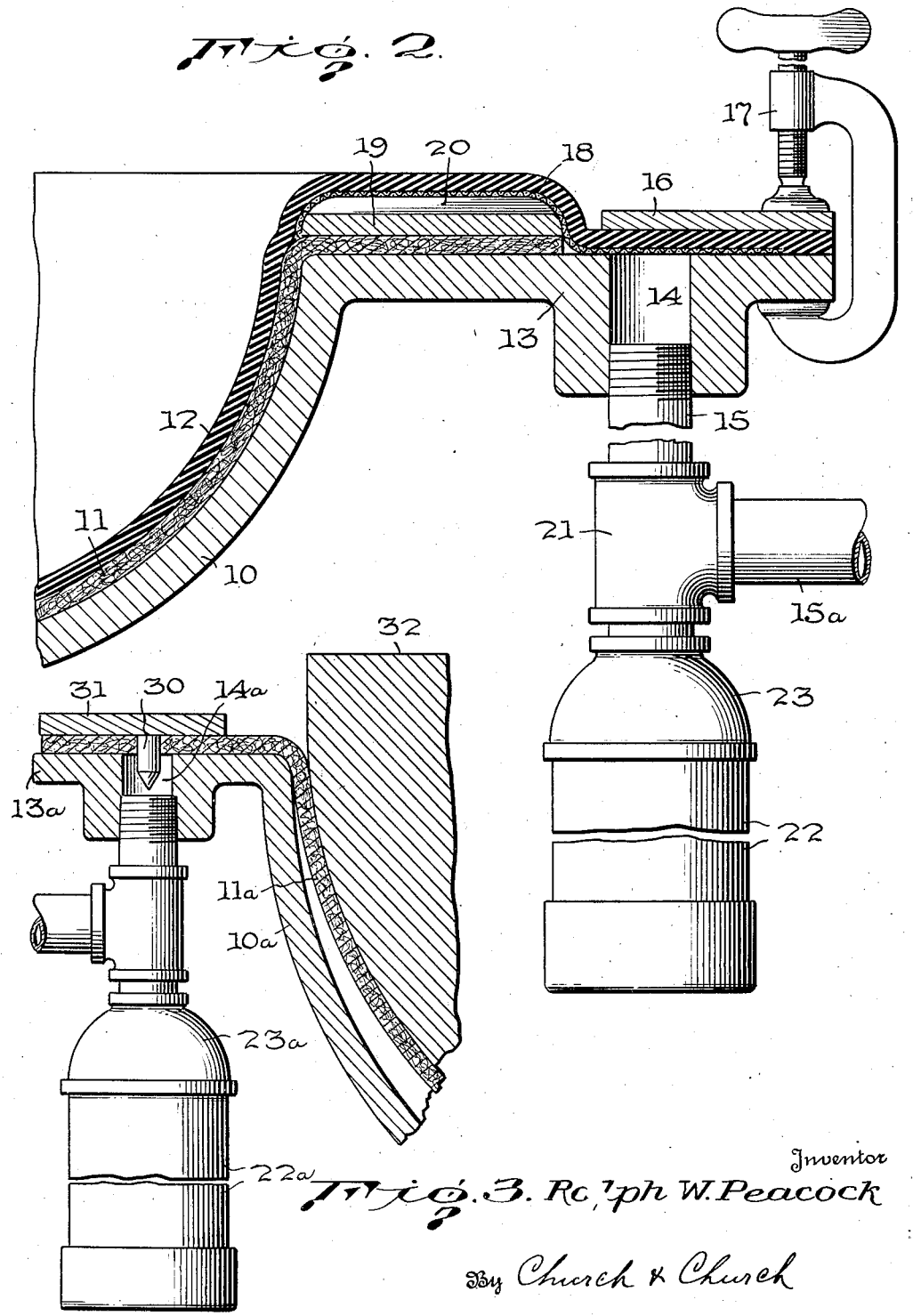

Patented May 22, 1945

2,376,805

UNITED STATES PATENT OFFICE 2,376,805

MOLDING APPARATUS

Ralph W. Peacock, Auburn, N. Y., assignor to Columbian Rope Company, Auburn, N. Y., a corporation of New York Application August 3, 1943, Serial No. 497,226

6 Claims. (Cl. 18—35)

This invention relates to improvements in molding apparatus and particularly to mold assemblies especially adapted for use in present day, so-called, low pressure molding.

Generally speaking, in this low-pressure molding, the material, including a binder to be molded, is loaded into a mold of the desired shape or contour on its molding surface with its exposed surface sealed with a suitable flexible covering and, after the material and covering are sealed against the mold around the edge of the latter, a vacuum line is attached to a connection provided in the mold or covering, so as to draw off air trapped in the molding material thus sealed between the covering and mold. The loaded mold is then placed in a pressure chamber or autoclave and subjected to pressure, either with or without the application of heat, depending upon the nature of the binder used in the material being molded. This treatment, in the autoclave or pressure chamber molds and sets the material and, during this treatment, the vacuum line is usually, again, connected to the mold to evacuate any gases that might be generated in the material while being molded.

Usually, the mold proper has a plurality of openings therein, for instance, in a peripheral flange, which serve as guides for aiding in placing the cover in proper registry with the mold when the latter is being loaded and these openings, in prior mold structures, always become filled with the binder material. If the binder is of such a nature that it sets or hardens in the alining openings, the latter have to be cleaned practically after each molding operation or, otherwise, difficulty is experienced in properly assembling the mold and, frequently, inferior or faulty moldings are produced. The same difficulties are also experienced where the material to be molded is preshaped in forms or preliminary shaping molds prior to being loaded in a second or final mold for treatment in the pressure chamber. These pre-shaping forms also have openings for properly assembling them and, as stated, these openings likewise become filled with the hardened binder.

The primary object of the present invention, therefore, is to provide a mold or mold assembly wherein the difficulty of the alining openings becoming clogged up or filled with the binder material is obviated.

Another object of the invention is to provide a mold assembly in which the air and gases are evacuated from the material in the mold by a venting system or vacuum line connected to the mold proper, as distinguished from the cover, and to prevent the accumulation of the binder material in the venting system. More specifically, the invention contemplates the use of traps or similar receptacles connected to the alining openings and the venting lines for the purpose of collecting the binder material that would otherwise accumulate in the openings and lines.

A still further object is to provide a mold assembly in which the venting system is attached to the mold proper and in which proper communication between said system and the mass of material loaded in the mold is assured, notwithstanding the fact that the material and its cover are firmly clamped against the mold around the perimeter of the latter to hermetically seal the assembly along this line.

With these and other objects in view, the invention consists in certain details of construction and combinations and arrangements of parts, all as will hereinafter be more fully described and the novel features thereof particularly pointed out in the appended claims.

In the accompanying drawings, wherein the preferred embodiment of the invention is illustrated—

Figure 1 is a perspective view, partially broken away, of a mold loaded and assembled;

Fig. 2 is a sectional view on the line 2—2 of Fig. 1; and

Fig. 3 is a similar sectional view taken through the edge portion of a loaded pre-shaping form or mold.

Referring particularly to Figs. 1 and 2, the mold proper is indicated at 10, the material to be molded at 11, and the cover for confining the material in the mold at 12. The mold shown in the present instance is for molding half-sections of jettison fuel tanks for air-craft, but, of course, molds of any desired shape may be used. Likewise, the invention is not limited to any particular type of cover 12, although a cover of the rubber blanket type is used herein for purposes of illustration. Also, for purposes of the present description, the material loaded in the mold will be assumed to be composed of an intersticed body of vegetable fibers (the so-called filler) and a binder of the heat-responsive type.

The mold 10 has a flange 13 around its edge with openings 14 therein for connecting the vent lines 15 which, in turn, are connected to a vacuum pump (not shown). Flange 13 is of such width as to extend beyond the edge of the molding composition 11 which rests on said flange when the mold is loaded, and the vent openings 14 are preferably formed at points where they will be located beyond the edge of the material 11. In order to draw off air and gases from the material in the mold, the assembly must be sealed around the edge and for this purpose the cover 12 is clamped against the mold flange. A clamping ring 16, held in place under suitable pressure by a series of clamps 17, may be used for this purpose. However, to maintain communication between the vent openings 14 and the body of molding material 11, a piece of foraminous material 18, for instance, wire mesh material, is positioned against the inner surface of cover 12 so as to extend from a point outside the openings 14 to at least the inner edge of flange 13. To further facilitate evacuation of air and gases from the material 11, there is preferably provided between the cover 12 and the edge of the material, a series of plates 19 corresponding to the number of vent openings, and each is provided with one or more air passages which may take the form of transverse grooves 20. Where these plates are used, they are arranged in registry with the vent openings and the sheets of foraminous material 18 extend over the faces of the plates 20 in which the grooves 20 are formed. Thus, regardless of the pressure used in sealing the edge of the material and cover around the edge of the mold, the venting openings will always be connected, so to speak, to the body of molding material. Furthermore, by using the wire mesh 18, or other similar material, which extends over the vent openings, any of the fibers that might be dislodged during the evacuation of air and gases cannot gain access to the venting system. However, particles of binder material that might be drawn off with the air and gases can or may pass through the wire mesh into the venting system. For this reason, each vent line is formed with an offset or angle by the use of a T coupling 21 from which the vent line extension 15ª extends at right angles to the connection 15 and from which a trap or other receptacle 22 depends in alinement with the connection 15. Preferably, the trap 22 is threaded on a reducer coupling 23 or a short section of pipe attached to coupling 21, so that the capacity of the trap can be increased and the trap can be removed when desired. Thus, any binder material entering the vent connections 15 will be trapped and collected in the receptacles 22 and, when the latter become filled, they can be easily removed and emptied.

It will be understood that the manner in which the molding material is loaded into the mold has only been generally described as it forms no part of the present invention and, furthermore, the details of such loading may be varied in various respects. It will also be appreciated that the invention is not limited to use solely in connection with molding material composed of mechanically interlaced fibers and a binder. For this reason, the term "intersticed body of fibers" is intended to comprehend the molding of other materials such as compositions having canvas or fabric fillers, and laminated plywood, wherein the laminations are secured together with a suitable binder or cement.

The invention, in its broader aspects, is also applicable to the forms or dies used in pre-shaping sheets or bodies of intersticed material. The pre-shaping is more fully shown and described in an application of Kenneth H. Bowen and Henry C. Nelson, Jr., Serial No. 474,604. As shown in Fig. 3, the pre-shaping form or mold 10ª is formed with a flange 13ª having openings 14ª therein with which pins 30 on a ring 31 are adapted to register when the material 11ª is to be shaped in the mold by means of a die 32. In this pre-shaping step, no vacuum is used and, for this reason, the traps or receptacles 22ª are merely attached to the reducer couplings 23ª which, in turn, are secured in the opennigs 14ª. In this instance, binder material displaced from the molding composition will not accumulate in the flange opening, but will be deposited in the trap and possibly, to some extent, in the coupling 23ª, either or both of which may be detachable for removing the accumulated binder.

What I claim is:

1. An assembly for molding an intersticed body of filler and binder materials, said assembly comprising a mold having an apertured flange, a cover for confining said composition against said mold and flange, a plate disposed between said cover and body and having air passages therein, said air passages being connected to the aperture in the mold flange, a vacuum line attached to said opening for evacuating air and gases from said body through said passages, and a receptacle in said vacuum line for collecting binder material evacuated with said air and gases.

2. An assembly for molding an intersticed composition of filler and binder materials, said assembly comprising a mold having an aperture therein, a cover for confining the composition against said mold, said cover overlying said aperture, a perforate member interposed between said cover and said composition and aperture and constituting a vent extending from said composition to said aperture, a vacuum line connected to said aperture for extracting air and gases from the confined composition, and a receptacle in said vacuum line for collecting binder material passing through said aperture.

3. An assembly for molding an intersticed composition of filler and binder materials, said assembly comprising a mold, an apertured flange on said mold, a cover overlying said mold and flange for confining the composition against the mold, a plate interposed between said cover and composition and having an air passage therein, a foraminous member extending from a point overlapping said plate to a point overlying said aperture, a vacuum line connected to said aperture for withdrawing air and gases from the confined composition, and means in said vacuum line for collecting binder material passing through said aperture.

4. In a mold assembly for molding an intersticed body of material having a thermo-responsive binder distributed therethrough, a mold having a peripheral flange against which the body of material is adapted to be secured, a flexible covering for said material, said body of material and covering being adapted to be clamped against said flange to hermetically seal the assembly around said flange, said mold having a venting opening through which air and gases in the interstices of said body can be evacuated while said material is clamped to the mold, and a container attached to said vent in which binder evacuated with said air and gases is deposited and retained.

5. An assembly for molding or shaping an intersticed body of molding composition having a binder distributed therethrough, said assembly comprising a mold member, a flange on said mold member and against which said composition is pressed while being molded, said flange having a plurality of apertures therein, and receptacles having tubular extensions connected to said apertures for collecting binder material pressed from the molding composition and passing through said flange apertures.

6. An assembly for molding or shaping an intersticed body of molding composition having a binder distributed therethrough, said assembly comprising a mold member, a flange on said mold member and against which said composition is pressed while being molded, said flange having a plurality of apertures therein, receptacles having tubular extensions connected to said apertures for collecting binder material pressed from the molding composition and passing through said flange apertures, and a vacuum line connected to the tubular extension of at least one of said receptacles.

RALPH WM. PEACOCK.